Dec. 9, 1924.

F. HIMMEL ET AL

STORE FRONT CONSTRUCTION

Filed June 20, 1924

1,518,582

Inventors
Fred Himmel
Isidore Himmel
by Seymour Pearce
Atty

Patented Dec. 9, 1924.

1,518,582

UNITED STATES PATENT OFFICE.

FRED HIMMEL AND ISIDORE HIMMEL, OF NEW HAVEN, CONNECTICUT.

STORE-FRONT CONSTRUCTION.

Application filed June 20, 1924. Serial No. 721,195.

*To all whom it may concern:*

Be it known that we, FRED HIMMEL and ISIDORE HIMMEL, citizens, respectively, of the United States and Austria, residing at New Haven, in the county of New Haven and State of Connecticut, have invented a new and useful Improvement in Store-Front Constructions; and we do hereby declare the following, when taken in connection with the accompanying drawings and the characters of reference marked thereon, to be a full, clear, and exact description of the same, and which said drawings constitute part of this application, and represent, in—

Figure 1:
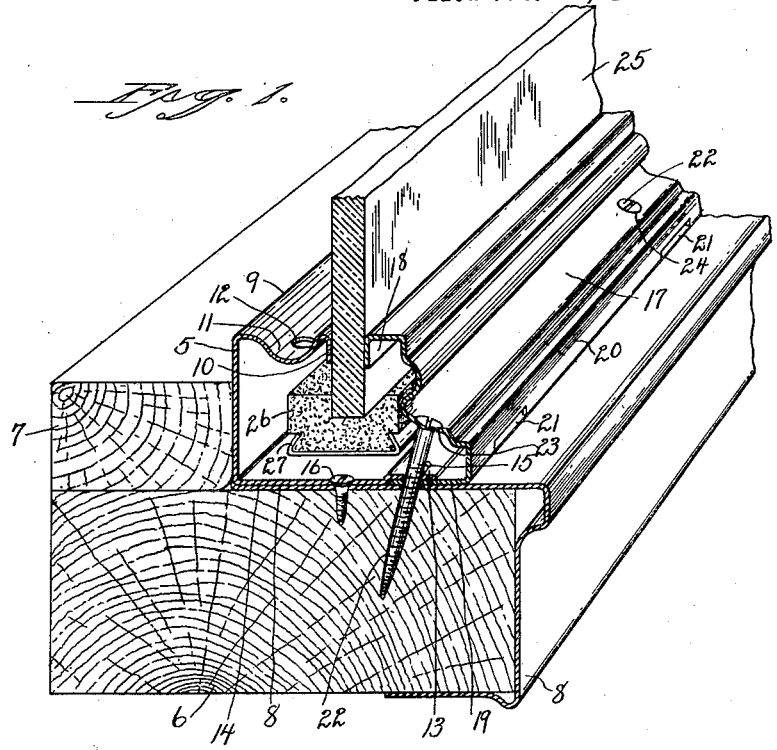

Fig. 1, a broken, perspective, sectional view of a store-front construction embodying our invention.

Figure 2:
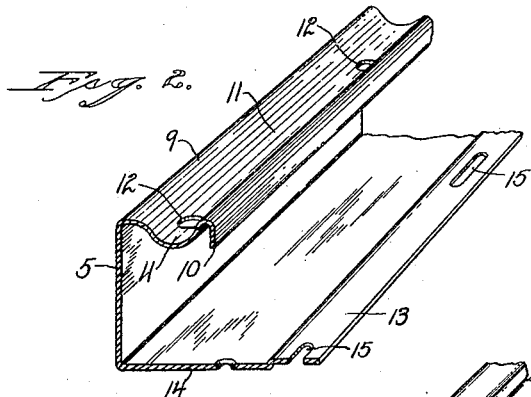

Fig. 2, a perspective view of a section of the inner, sash-holding bar, detached.

Figure 3:
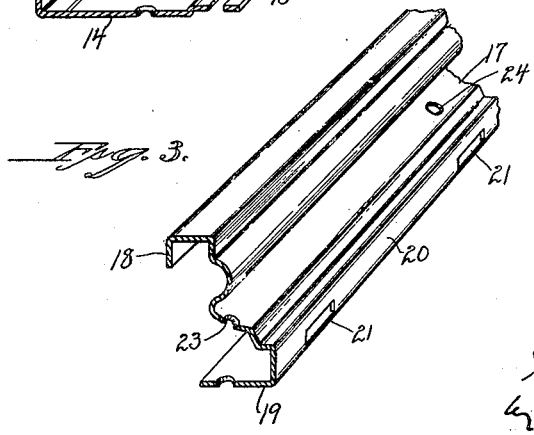

Fig. 3, a perspective view of a section of the outer, sash-holding bar, detached.

This invention relates to improvement in store-front construction, wherein metal sash-holding bars are provided both inside and outside of a sheet of glass, for holding the glass in position. In store-front construction, it sometimes occurs that the sheet of glass settles, and if it strikes the screws by which the holding-bars are secured in place, it is liable to crack. Furthermore, in store-front construction, moisture on the surfaces of the glass is liable to work its way between the glass and holding-bars and accumulate in the housing formed by the bars, and one object of this invention is to provide for draining the housing; another object is to secure the outer sash-holding bar in such a way that the glass cannot, by any possibility, come into contact with the screws by which the outer bar is held in place, and another object is to so form the bars that the screws used in securing the outer holding-bars in place will pass through the inner holding-bar, so as to interlock these two parts together, and so limit their relative movement, thus giving increased even pressure on the surfaces of the glass, and the invention consists in the construction as hereinafter described and particularly recited in the claims.

In carrying out our invention, we employ an inner sash-holding bar 5, usually located in an angle formed by a main strip 6 and a segmental strip 7 and usually resting on a sheet-metal facing-strip 8 which encloses the exposed portion of the main strip 6. This inner sash-holding bar includes a top-flange 9 with an in-turned edge 10 and the surface of the flange 9 is preferably curved to form a channel 11, which at intervals is formed with drainage perforations 12.

The outer edge 13 of the base 14 is set inward and formed with slots 15, for the purpose as will be hereinafter described. This inner sash-holding bar is secured to the main strip by screws 16. The outside sash-holding bar 17 has an inwardly-turned edge 18 and an inwardly-projecting base-flange 19, which is adapted to pass beneath the edge 13 of the inner sash-holding bar, and at the junction of the flange 19 with the central portion 20 of the outer sash-holding bar a series of drain-openings 21 is provided. The outer sash-holding bar is secured in place by screws 22 passing through perforations 23 and 24 in the sash-holding bar and through the slots 15 in the flange 13. A sheet of glass 25 is located between the edges 10 and 18 of the respective holding-bars and preferably is supported by wooden blocks 26 held by metal clips 27 secured to the base of the inner sash-holding bar.

In mounting the glass, the inner sash-holding bar is first secured in place, then the glass placed in position and the outer sash-holding bar pressed against the outer surface of the glass and the base-flange 19 extending beneath the base-flange 13 of the inner sash-holding bar. The screws 22 are then inserted, and by providing the slots 15, the passage of the screws through the flange 13 is facilitated, because, by forming the slots, close adjustment is not necessary. The screws 22 not only hold the outer sash-holding bar in place but, owing to the angle at which they are entered and the form of the outer holding-bar, they tend to crowd the flange 18 against the face of the glass, thus clamping it firmly in position. The screws 22 also interlock the two holding-bars together, thus adding to the security of the construction.

Any water entering between the surfaces of the glass and the holding-bars will escape through the slots 21 and not find its way between the bars into the main strip. We, therefore, not only provide rigid means for holding the glass in store-front construction, but provide for draining the housing, if necessary.

We claim:

1. A store-front construction, comprising an inner sash-holding bar and an outer sash-holding bar, both formed with inturned edges between which a sheet of glass is mounted, the edge of the base of one member offset to extend over the surface of the base of the other member, and screws passing through the outer bar and through the overlapping bases of both bars.

2. A store-front construction, comprising inner and outer sash-holding bars, the inner sash-holding bar having an in-turned edge and a base with an offset flange, the outer sash-holding bar formed with an in-turned edge and with an inwardly-extending base-flange adapted to extend under the flange of the base of the inner sash-holding bar, the inner sash-holding bar formed near the base with slots and screws extending through the outer holding-bar and through the overlapping edges of both bases into a main strip.

In testimony whereof, we have signed this specification in the presence of two subscribing witnesses.

FRED HIMMEL.
ISIDORE HIMMEL.

Witnesses:
JOSEPH I. SACHS,
CELIA SLATER.